(12) United States Patent
Hayes (10) Patent No.: US 7,113,098 B1
(45) Date of Patent: Sep. 26, 2006

(54) ANIMAL ACCIDENT REDUCTION SYSTEMS, METHODS, AND APPARATUSES

(76) Inventor: Melvin Hayes, 12723 Sandpebble Cir., No. 2, Newport News, VA (US) 23606

( * ) Notice: Subject to any disclaimer, the term of this patent is extended or adjusted under 35 U.S.C. 154(b) by 0 days.

(21) Appl. No.: 10/652,090

(22) Filed: Aug. 29, 2003

Related U.S. Application Data (60) Provisional application No. 60/406,700, filed on Aug. 29, 2002.

(51) Int. Cl.
*G08B 23/00* (2006.01)

(52) U.S. Cl. .............. 340/573.2; 340/933; 340/693.5; 404/12

(58) Field of Classification Search .............................. 340/693.5–693.12, 573.2
See application file for complete search history.

(56) References Cited

U.S. PATENT DOCUMENTS

| | | | |
|---|---|---|---|
| 3,516,384 A | | 6/1970 | Will |
| 3,890,612 A | | 6/1975 | Sweany et al. |
| 3,938,080 A | * | 2/1976 | Hulme ............... 340/908.1 |
| 4,091,383 A | | 5/1978 | Rainville |
| 4,104,610 A | | 8/1978 | Inoue et al. |
| 4,437,428 A | | 3/1984 | Hoffelner |
| 4,841,278 A | * | 6/1989 | Tezuka et al. ......... 340/908.1 |
| 4,903,630 A | | 2/1990 | Rezmer |
| 4,993,868 A | * | 2/1991 | Eigenmann ............... 404/12 |
| 4,998,091 A | | 3/1991 | Rezmer |
| 5,074,706 A | * | 12/1991 | Paulos .................. 404/12 |
| 5,214,411 A | | 5/1993 | Herbruck |
| 5,277,516 A | | 1/1994 | Strieter |
| 5,320,446 A | | 6/1994 | Strieter |
| 5,410,346 A | | 4/1995 | Saneyoshi et al. |
| 5,412,381 A | * | 5/1995 | Dicks .................. 340/908.1 |
| 5,418,518 A | | 5/1995 | Schenken et al. |
| 5,448,233 A | | 9/1995 | Saban et al. |
| 5,515,026 A | * | 5/1996 | Ewert .................. 340/436 |
| 5,588,684 A | | 12/1996 | Kiefer |
| 5,602,523 A | | 2/1997 | Turchioe et al. |
| 5,617,085 A | | 4/1997 | Tsutsumi et al. |
| 5,627,510 A | | 5/1997 | Yuan |
| 5,627,518 A | | 5/1997 | Wishart |
| 5,757,288 A | * | 5/1998 | Dixon et al. ........... 340/941 |

(Continued)

FOREIGN PATENT DOCUMENTS

CA 2106276 6/1998

(Continued)

OTHER PUBLICATIONS

Lixia Zhou, Joseph M. Kahn, and Kristofer S. J. Pister, "Corner-Cube Retroreflectors Based on Structure-Assisted Assembly for Free-Space Optical Communication", *Journal of Microelectromechanical Systems*, vol. 12, No. 3, Jun. 2003, p. 233-242.

(Continued)

*Primary Examiner*—Benjamin C. Lee
(74) *Attorney, Agent, or Firm*—Bowman Green Hampton & Kelly, PLLC (57) ABSTRACT

An animal accident reduction system, method, and apparatus. The apparatus including at least some of a housing having substantially the same external size and shape of a raised reflective pavement marker, at least one input detector located within the housing, at least one logic and control circuit located within the housing, and at least one output device located within the housing, wherein the logic and control circuit is capable of receiving a signal from the input detector, wherein the output device is capable of receiving a signal from the logic and control circuit, and wherein the output device is capable of producing a determined sound, noise, or other vibration.

20 Claims, 5 Drawing Sheets

U.S. PATENT DOCUMENTS

| | | | |
|---|---|---|---|
| 5,892,446 A * | 4/1999 | Reich | 340/573.1 |
| 5,939,987 A | 8/1999 | Cram | |
| 5,942,993 A * | 8/1999 | Mio et al. | 340/933 |
| 5,949,331 A | 9/1999 | Schofield et al. | |
| 5,963,148 A | 10/1999 | Sekine et al. | |
| 5,969,593 A | 10/1999 | Will | |
| 5,983,161 A | 11/1999 | Lemelson et al. | |
| 6,216,985 B1 | 4/2001 | Stephens | |
| 6,252,496 B1 | 6/2001 | Jackson | |
| 6,268,803 B1 | 7/2001 | Gunderson et al. | |
| 6,281,806 B1 | 8/2001 | Smith et al. | |
| 6,288,651 B1 * | 9/2001 | Souza | 340/933 |
| 6,623,206 B1 * | 9/2003 | Blair et al. | 404/16 |
| 2002/0149493 A1 * | 10/2002 | Yudate et al. | 340/693.5 |
| 2003/0071735 A1 * | 4/2003 | Hanson et al. | 340/573.2 |
| 2003/0206118 A1 * | 11/2003 | Verkleeren et al. | 340/933 |

FOREIGN PATENT DOCUMENTS

| | | | |
|---|---|---|---|
| DE | 4033382 A1 * | 4/1992 | |
| DE | 19902154 | 10/1999 | |
| WO | WO 95/10933 * | 4/1995 | |

OTHER PUBLICATIONS www.isd.com.
http://www.isd.com/news/pressrel/05-19-2003.shtml.
http://mutcd.fhwa.dot.gov/kno-millennium.htm.
http://www.strieter-lite.com.
www.xp3hornet.com.
www.ncnwest.com.
www.curbmarker.com.
www.rayolite.com.
http://131.103.244.173/markers_snowplowable.html.
http://131.103.244.173/markers_surface.html.
http://131.103.244.173/markers_66.html.
www.dbiservices.com.
www.jbcsafety.com.
http://products3.3m.com/catalog/us/en001/safety/traffic_control/node_GSMQJ538PXbe/root_GST1T4S9TCgv/vroot_1PGXVVLN9Xge/gvel_D9B7NST8KWgl/theme_us_trafficcontrol_3_0/command_AbcPageHandler/output_html.

* cited by examiner

ANIMAL ACCIDENT REDUCTION SYSTEMS, METHODS, AND APPARATUSES

CROSS-REFERENCE TO RELATED APPLICATIONS

This application claims the benefit of U.S. Provisional Application No. 60/406,700, filed Aug. 29, 2002, the disclosures of which are incorporated herein by reference.

BACKGROUND OF THE INVENTION

1. Field of Invention

This invention relates generally to animal warning devices.

2. Description of Related Art

It is well know for raised reflective pavement markers to be installed along portions of roadway to mark lane lines, center and edge lines, turn pockets, curb dividers and stop bars. The raised reflective pavement markers typically employ a corner-cubed retro-reflector technology that gathers light from an approaching vehicle's headlights and returns the light to the vehicle's driver in a narrow, focused beam. In this manner, it is easier for a driver to identify the roadway, particularly at night or during inclement weather.

Raised reflective pavement markers are typically formed from a weather-resistant acrylic or polymer blend housing, which affixed either directly to the roadway surface, in specifically designated snow-plowable housings, or within indentions specifically created in the surface of the roadway. The pavement markers are shaped such that they are relatively resistant to impact damage from vehicle tires and to breakage due to spot loading from uneven road surfaces.

It is also known that certain sounds, noises, or other vibration can be used to effectively deter certain animals from entering or remaining in a given area.

SUMMARY OF THE INVENTION

The animal accident reduction apparatuses of this invention include at least some of a photodiode electric circuit, a smart chipset, and a speaker output, inside the housing of a raised reflective pavement marker. Thus, in one exemplary embodiment, when the apparatuses of this invention detect the light of a vehicle's headlights, the animal accident reduction apparatus is activated and a sound wave or other vibration is temporarily generated in an effort to deter animals in the vicinity of the animal accident reduction apparatus from nearing or crossing the roadway.

The systems and methods of this invention utilize a series of animal accident reduction apparatuses placed along a specific portion of a roadway. Thus, as a vehicle travels along the specific portion of roadway, the vehicle's headlights temporarily activate each animal accident reduction apparatus, in turn, as the vehicle approaches each animal accident reduction apparatus. Then, after the vehicle passes the animal accident reduction apparatus, the microcontroller senses the absence of a vehicle and shuts off the device output.

In various exemplary embodiments of the present invention, the animal accident reduction apparatuses may include an infrared sensor so that the animal accident reduction apparatuses respond to a predetermined amount of movement.

In another exemplary embodiment of the present invention, when the animal accident reduction apparatuses deactivate during daylight hours so that the animal accident reduction systems, methods, and apparatuses of this invention can provide a form of dusk to dawn animal deterrent. Alternatively, the animal accident reduction systems, methods, and apparatuses of this invention may include a clock in the logic and control circuitry, such that the invention may be set for dusk to dawn operations or other energy conserving operations.

The animal accident reduction systems, methods, and apparatuses of this invention combine the safety features of the raised reflective pavement marker with the animal deterrent features of a specifically generated sound wave or other vibration in a way that is unnoticeable to the vehicle's driver. Thus, the driver is provided with an increased level of protection from animals entering the roadway in a way that allows the motorist to concentrate on safe driving.

Accordingly, this invention provides a safety device that reduces the distraction of surprise defensive reactions for drivers who encounter active animal paths or animals entering or crossings a public roadway. Thus, a distraction to driving is removed such that the driver can concentrate more intently on safe driving.

This invention separately provides a chipset that can be programmed and/or reprogrammed with a variety of sound, vibration, or other output options with variable duration, to meet predetermined time frame requirements. In various exemplary embodiments, the duration and intensity of the output is controlled by the microcontroller.

This invention separately provides an animal accident reduction apparatus that is housed in a Department of Transportation (DOT) approved raised reflective pavement marker housings.

This invention separately provides an animal accident reduction apparatus that may be mounted on roadside posts or in specifically designated snow-plowable housings.

This invention separately provides a high frequency audio deterrent sound that alerts animals of impending high-speed motor vehicle traffic, which has an effect that is similar to the blowing of an automobile horn or the sounding of an emergency vehicle's siren.

This invention separately provides an animal accident reduction system automatically shuts down after a motor vehicle has passed.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following Figures, wherein like reference numerals refer to like parts throughout the several views, and wherein.

DETAILED DESCRIPTION OF THE EXEMPLARY EMBODIMENTS

For simplicity and clarification, the operating principles, design factors, construction, layout, and operation of the animal accident reduction systems, methods, and apparatuses according to this invention are explained with reference to various exemplary embodiments of animal accident reduction systems, methods, and apparatuses according to this invention. The basic explanation of the operating principles, design factors, construction, layout, and operation of the animal accident reduction systems, methods, and apparatuses is applicable for the understanding and design of the constituent components employed in the animal accident reduction systems, methods, and apparatuses of this invention.

Figure 1:
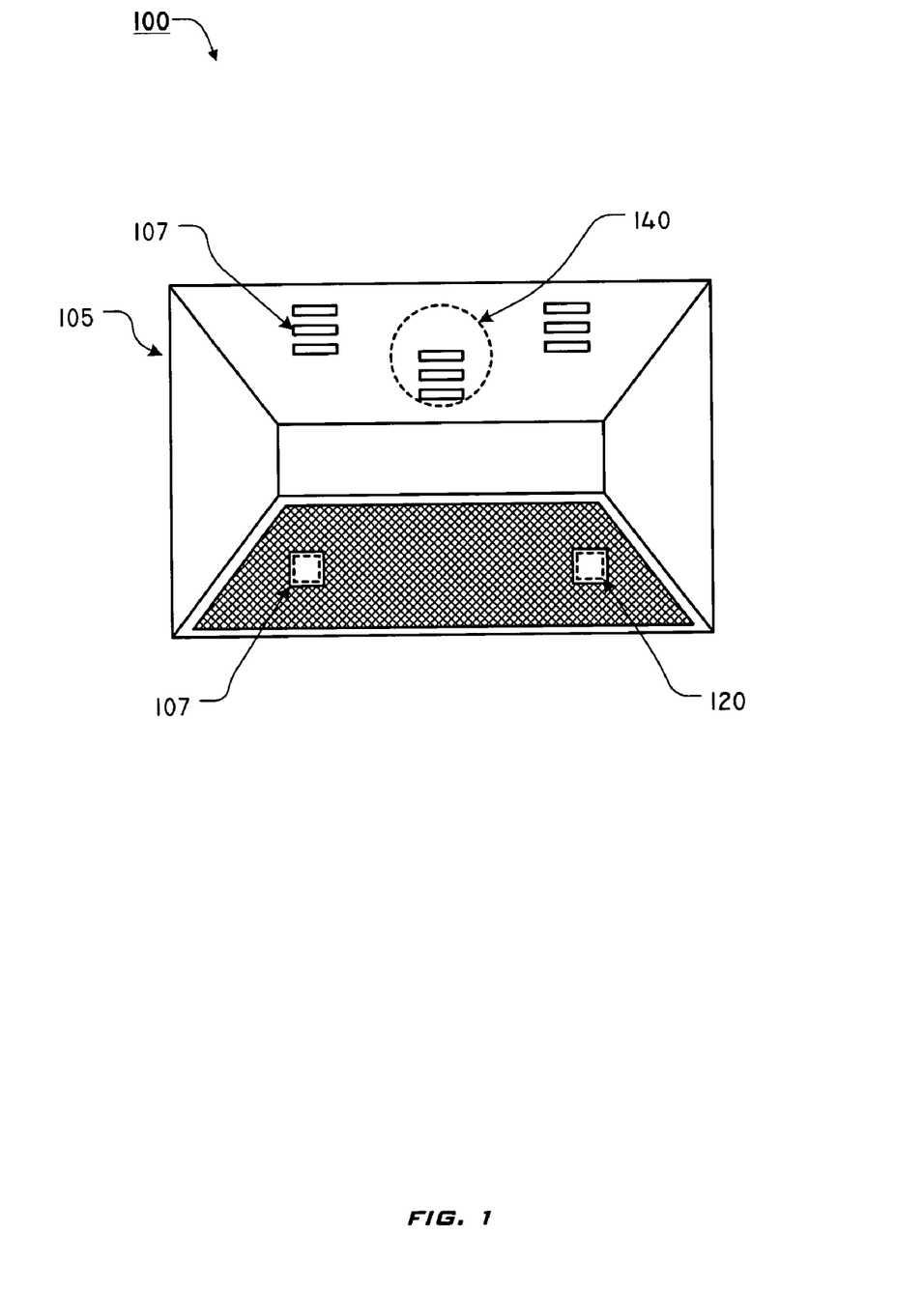
FIG. 1 shows a top view of an animal accident reduction system housed in a reflective pavement marker housing.

FIG. 1 shows a top view of a first exemplary embodiment of an animal accident reduction apparatus 100 housed in a reflective pavement marker housing 105 according to this invention. As shown in FIG. 1, the animal accident reduction apparatus 100 includes at least some of a reflective pavement marker housing 105, an input detector 120, a logic and control circuit 130 (not shown), and an output device 140.

The housing 105 retains substantially the same external size and shape of known raised reflective pavement markers, and is formed from a weather-resistant material, such as, for example, an acrylic or polymer blend. In this manner, the animal accident reduction apparatus 100 may maintain the basic features of known raised reflective pavement markers and may be affixed to a roadway just as known raised reflective pavement markers. Alternatively, the housing 105 may be mounted on roadside posts.

In various exemplary embodiments the housing 105 includes a variety of openings 107 that allow various input or output devices to receive into or transmit from the interior of the housing 105. It should be appreciated that in the various exemplary embodiments wherein the housing 105 includes certain openings 107, the openings 107 may be covered by a screen or film, such as a mylar film, to protect any components in the interior of the housing 105 from, for example, the elements or insects, while still allowing the various input or output devices to receive into or transmit from the interior of the housing 105.

The input detector 120 may be any device capable of detecting a certain level of light, such as, for example, a photodiode or an infrared sensor. In various exemplary embodiments the input detector 120 may be a side-looking photodiode.

In various exemplary embodiments, the input detector 120 may be or include an infrared sensor. If the input detector 120 is or includes an infrared sensor, movement of, for example, an oncoming vehicle, activates the input detector 120. In certain exemplary embodiments, the input detector 120 may include at least one of a photodiode and an infrared sensor. In this manner, the photodiode may, for example, functions as a primary detector, while the infrared sensor functions as a secondary detector.

The output device 140 may be any device capable of producing and/or transmitting a determined sound, noise, or other vibration. In various exemplary embodiments the output device 140 may be an audio speaker. However, it should be understood that, in various exemplary embodiments, the output device 140 may be an audio transducer device or a small vibration device.

The output device 140 may include a single device or may include multiple devices and the output device 140 may be driven singularly or in any combination as needed to produce a predetermined output that is sufficient to adequately coverage a predetermined area.

Additionally, the output device(s) 140 may be positioned so as to produce a directional output so that a predetermined output pattern may be produced by each animal accident reduction apparatus 100.

It should be appreciated that although FIG. 1 shows the animal accident reduction apparatus 100 including one output device 140, in various exemplary embodiments, the animal accident reduction apparatus 100 may including multiple output devices 140.

It should also be appreciated that the animal accident reduction apparatus 100 may be powered by battery or any combination of battery, solar cell, solar panel, capacitance, direct power connection, or any known or later developed system or structure usable to provide the necessary power to the animal accident reduction apparatus 100.

In various exemplary embodiments, the animal accident reduction apparatus 100 is capable of operating in at least one of two output modes. The first output mode is capable of producing a specific noise, sound, signal, or vibration, or a specific series of noises, sounds, or vibrations at a frequency of about 8 khz with standard bandpass frequency filtering. The second output mode is capable of producing a specific noise, sound, signal, or vibration, or a specific series of noises, sounds, or vibrations at an ultrasonic output frequency within a frequency range of about 20.5 khz to about 22.5 khz. it should be understood that the final output signals in either mode may be tuned, calibrated, and controlled by the logic and control circuit 130 (not shown) and its associated hardware and software. The above can include, but is not limited to signal conditioning circuitry for the ultrasonic output signal and output level attenuation and amplification for desired output range or coverage.

Figure 2:
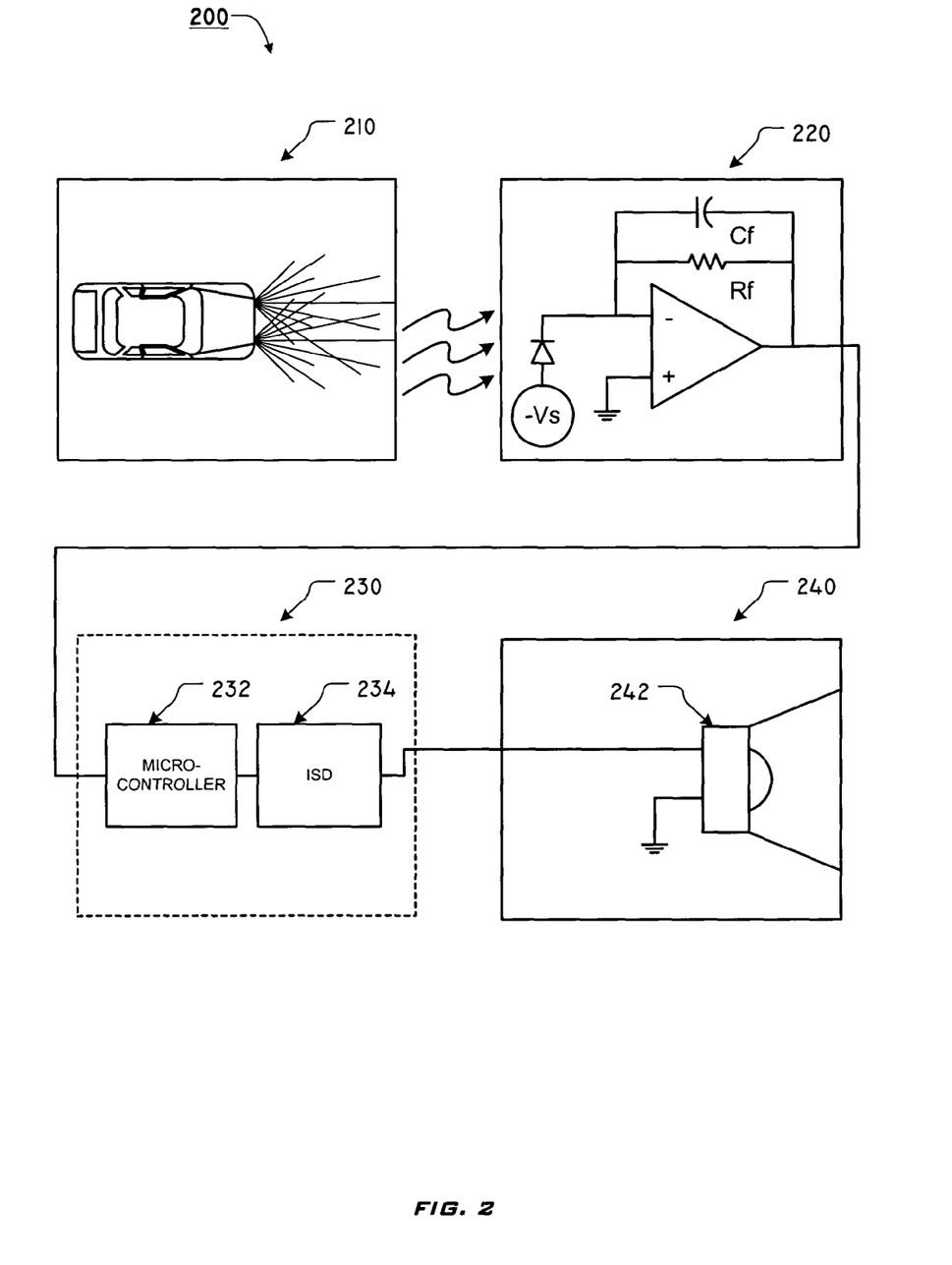
FIG. 2 shows a block diagram outlining the components and operation of one exemplary embodiment of an animal accident reduction system according to this invention.

FIG. 2 shows a block diagram outlining the components and operation of one exemplary embodiment of an animal accident reduction system 200 according to this invention. As shown in FIG. 2, the animal accident reduction system 200 includes at least some of an input 210, an input detector 220, a logic and control circuit 230, and an output device 240. It should be appreciated that each of these elements correspond to and operate similarly to the same elements discussed above with respect to FIG. 1. As further shown in FIG. 2, the input detector 220 interfaces with the logic and control circuit 230, which, in turn, interfaces with the output device 240.

It should be appreciated that, in various exemplary embodiments, the input detector 220, the logic and control circuit 230, and the output device 240 may each be housed within the reflective pavement marker housing 105, as described above with respect to FIG. 1. Likewise, in various exemplary embodiments, the input detector 220, may be the input detector 120 and the output device 240 may be the output device 140, as described above with respect to FIG. 1.

As shown in FIG. 2, the input 210 represents any light input of a sufficient brightness or intensity to be detected by the input detector 220. The parameters for the level of brightness or intensity to be detected by the input detector 220 may be determined based on the conditions under which the animal accident reduction system 200 is to be used and the function the animal accident reduction system 200 is to perform.

For simplicity and clarification, the embodiments of this invention will be described with reference to the input 210 being light by the headlights of an oncoming vehicle. However, it should be appreciated that the input 210 may be any form of light, detectable by the input detector 220, including, but not limited to any visible or invisible light from any natural or artificial light source.

In various exemplary embodiments, the input detector 220 may include a photodiode or an infrared sensor. If the input detector 220 includes an infrared sensor, movement of, for example, an oncoming vehicle, activates the input detector 220. In certain exemplary embodiments, the input detector 220 may include at least one of a photodiode and an infrared sensor. In this manner, the photodiode may, for example, functions as a primary detector, while the infrared sensor functions as a secondary detector.

The logic and control circuit 230 includes at least some of a microcontroller 232 and an Information Storage Device (ISD) 234. The microcontroller 232 manages receiving at least one input signal from the input detector 220 and sending at least one output signal to the ISD 234.

In various exemplary embodiments, the microcontroller 232 contains a clock circuit such that the microcontroller 232 may, in response to a received input signal from the input detector 220, send a timed output signal to the ISD 234. In this manner, signal may be sent to the ISD 234, such that the ISD 234 will produce an output for a determined period of time. Additionally, the clock circuit may function such that the invention may be set to operate only during a set time.

In various exemplary embodiments, the ISD 234 is a single-chip, single-message voice and/or signal record/playback device, such as, for example, one of the ISD1800 Series record/playback devices from Winbond Electronics Corporation America.

However, it should be appreciated that the ISD 234 may be any known or later developed system or structure usable to record and/or play back a message or create a specific noise, sound, signal, or other vibration, when connected to an appropriate output device.

The output device 240 may be any device 242 capable of producing and/or transmitting a determined sound, noise, or other vibration. In various exemplary embodiments the output device 240 may be an audio speaker. However, it should be understood that, in various exemplary embodiments, the output device 240 may be an audio transducer device or a small vibration device.

The output device 240 may include a single device 242 or may include multiple devices and the output device 240 may be driven singularly or in any combination as needed to produce a predetermined output that is sufficient to adequately cover a predetermined area.

Additionally, the output device(s) 242 may be positioned so as to produce a directional output so that a predetermined output pattern may be produced by each animal accident reduction system 200.

It should be appreciated that in various exemplary embodiments, the output device 240 may include an amplifier, such that sufficient power is supplied to the device 242, such that the device 242 can produce the required noise, sound, signal, or vibration. Alternatively, the logic and control circuit 230 may include an amplifier, such that sufficient power is supplied to the output device 240, such that the device 242 can produce the required noise, sound, signal, or vibration.

It should be appreciated that in various exemplary embodiments, the input detector 220, the logic and control circuit 230, and the output device 240 may interface with one another via certain signal conditioning circuitry, the construction of which may be altered based on the desired influence the signal conditioning circuitry is to have on the animal accident reduction system 200.

During operation of the animal accident reduction system 200, light from the headlights of an oncoming vehicle, representing the input 210, is detected by the input detector 220.

In response to the input 210 detecting a sufficient amount or wavelength of light (or movement), the input detector 220 sends a signal to the logic and control circuit 230. When the logic and control circuit 230 receives the signal from the input detector 220, the microcontroller 232 sends a predetermined signal to the ISD 234.

Then, when the ISD 234 receives the signal from the microcontroller 232, the ISD 234 sends a predetermined signal to the output device 240.

When the logic and control circuit 230 receives the signal from the input detector 220, the microcontroller 232 may optionally check various conditions, which are monitored, before the microcontroller 232 sends the predetermined signal to the ISD 234. For example, in various exemplary embodiments, the microcontroller 232 may check various conditions, such as lapse time between input signals, temperature, time of day, movement or activity in a predetermine domain, or humidity (moisture) before the microcontroller 232 sends the predetermined signal to the ISD 234. In these exemplary embodiments, if all required conditions are met, the predetermined signal is sent to the ISD 234.

Then, upon receipt of the predetermined signal, the output device 240 outputs a specific noise, sound, signal, or vibration, or a specific series of noises, sounds, signals, or vibrations.

In various exemplary embodiments, the animal accident reduction system 200 is capable of operating in at least one of two output modes. The first output mode is capable of producing a specific noise, sound, signal, or vibration, or a specific series of noises, sounds, or vibrations at a frequency of about 8 khz with standard bandpass frequency filtering.

The second output mode is capable of producing a specific noise, sound, signal, or vibration, or a specific series of noises, sounds, or vibrations at an ultrasonic output frequency within a frequency range of about 20.5 khz to about 22.5 khz.

It should be understood that the final output signals in either mode may be tuned, calibrated, and controlled by the logic and control circuit 230 and its associated hardware and software. The above can include, but is not limited to signal conditioning circuitry for the ultrasonic output signal and output level attenuation and amplification for desired output range or coverage.

Figure 3:
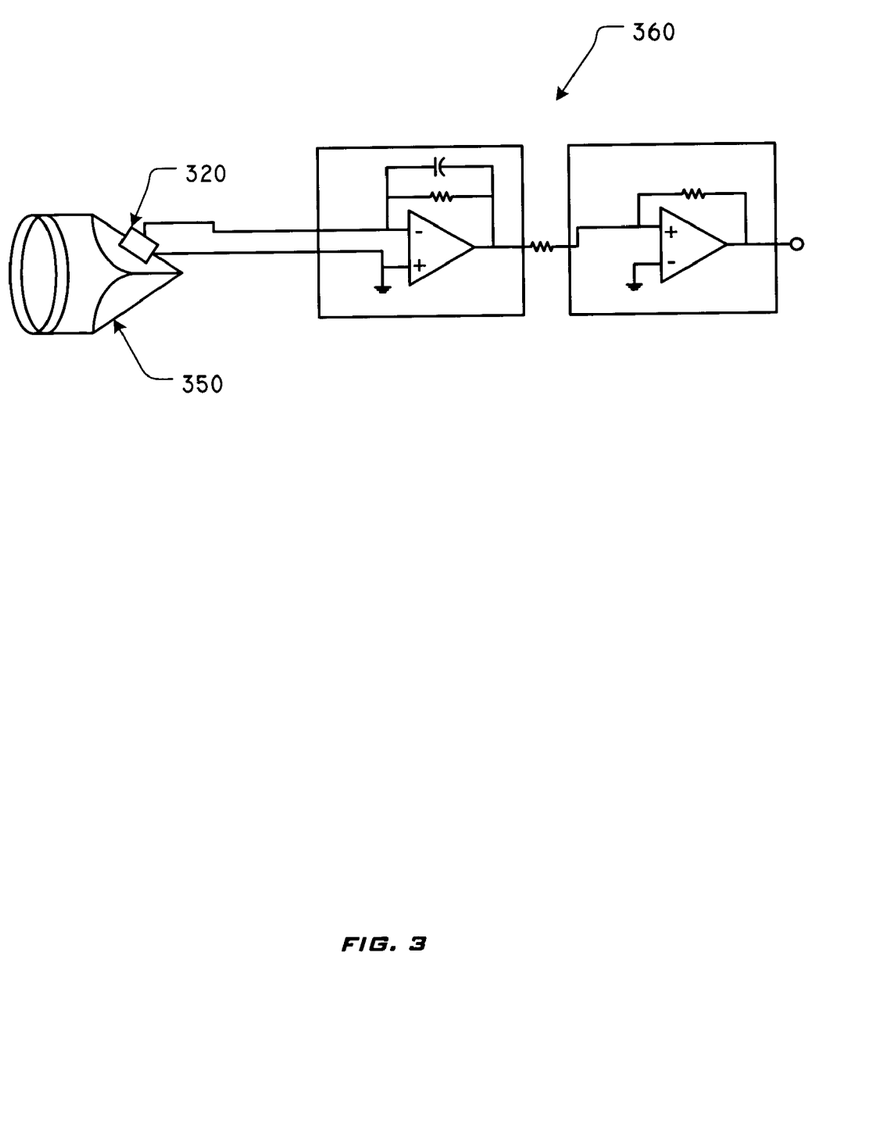
FIG. 3 shows a block diagram outlining one exemplary method interfacing an input detector with a corner-cubed retro-reflector of a raised reflective pavement marker according to this invention.

FIG. 3 shows a block diagram outlining one exemplary method interfacing an input detector with a corner-cubed retro-reflector of a raised reflective pavement marker according to this invention. As shown in FIG. 3, an input detector 320 is positioned along a side of a corner-cubed retro-reflector 350 of a raised reflective pavement marker, such that, as light enters the corner-cubed retro-reflector, the light is directed to the input detector 320.

When the light is detected by the input detector 320, a signal is generated by the signal conditioning circuitry 360.

Figure 4:
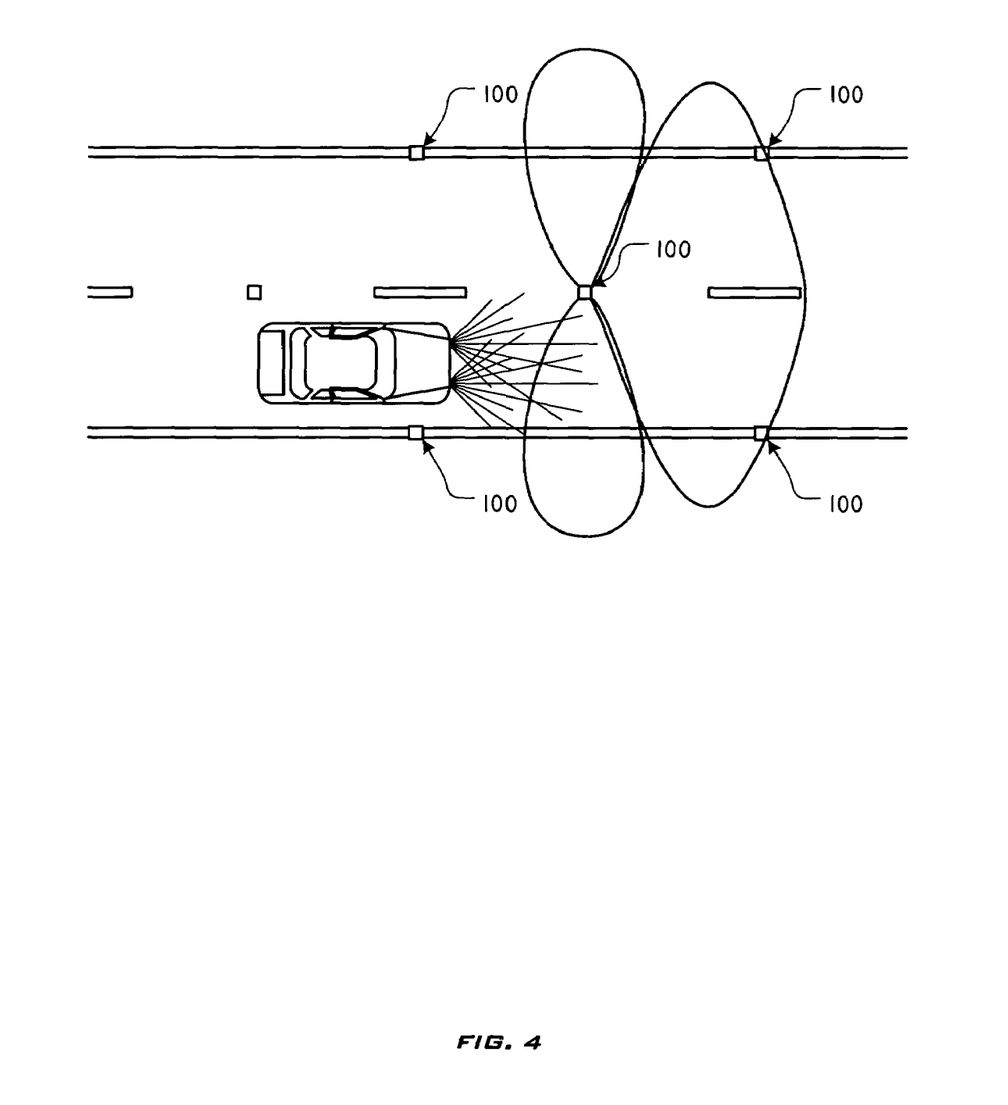
FIG. 4 shows an overhead view of one exemplary output coverage pattern according to this invention.

FIG. 4 shows an overhead view of one exemplary output coverage pattern according to this invention. As described herein, the apparatuses, systems, and methods of this invention may be used to produce a directional output so that a predetermined output pattern may be produced by each animal accident reduction apparatus.

As shown in FIG. 4, several animal accident reduction apparatus 100 may be positioned to produce an exemplary output pattern. It should be appreciated that the overall size and shape of the output pattern may be modified, using the principles of this invention, to provide a desired output pattern for each specific application.

Figure 5:
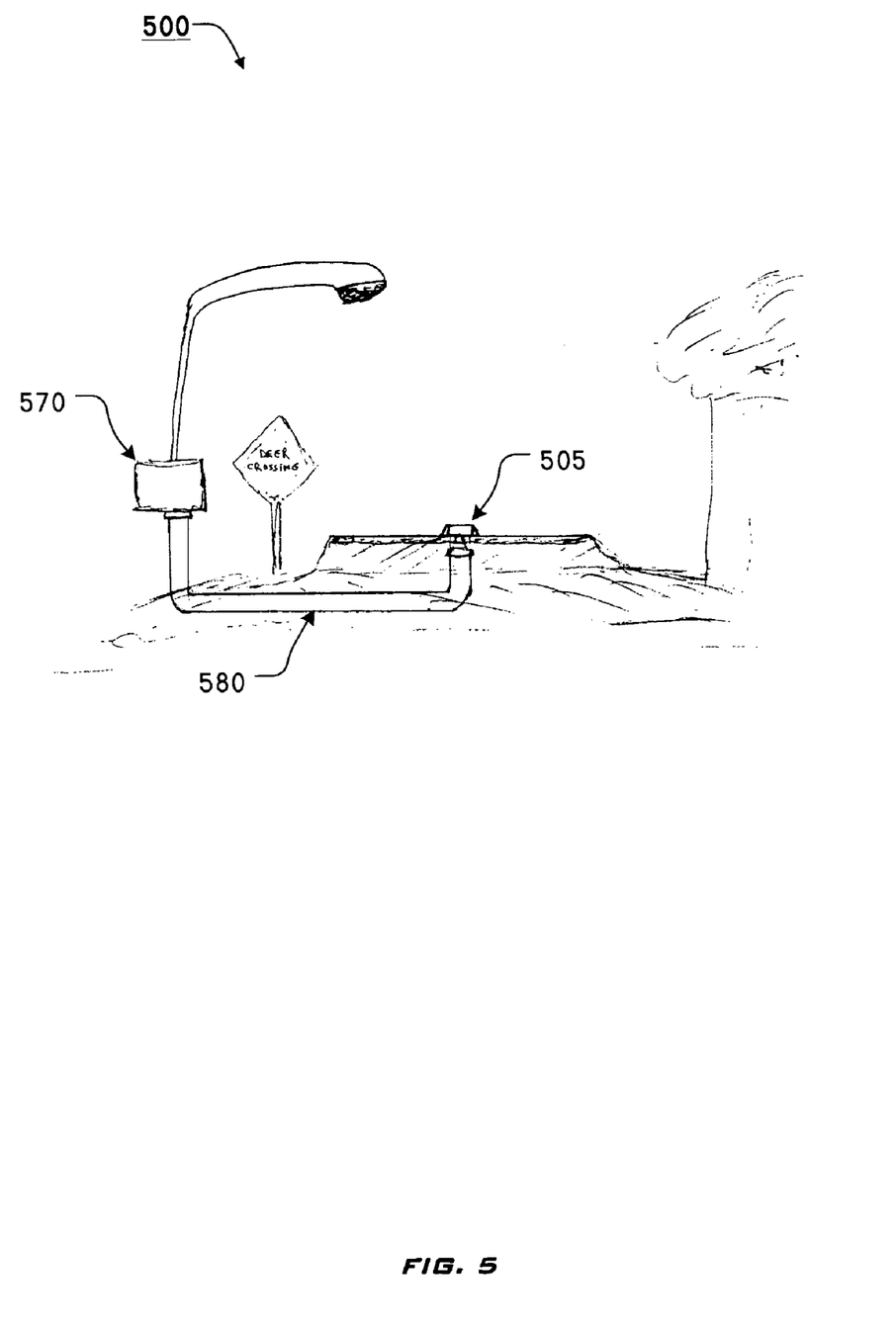
FIG. 5 shows a second exemplary embodiment of an animal accident reduction system 500 according to this invention.

FIG. 5 shows a second exemplary embodiment of an animal accident reduction system 500 according to this invention. As shown in FIG. 5, the animal accident reduction system 500 includes at least some of a housing 505, a power and control apparatus 570, and a connection 580.

For certain applications, such as, for example, in desert climates or environments with extreme temperatures or weather conditions, the animal accident reduction system 500 may be used. The animal accident reduction system 500 may include any of the components of the animal accident reduction apparatus 100, as described above, with respect to FIG. 1, or the animal accident reduction system 200, as described above, with respect to FIG. 2.

It should be appreciated that each of the elements or components included in the animal accident reduction system 500 correspond to and operate similarly to the corresponding elements or components as described above with respect to the animal accident reduction apparatus 100, as described above, with respect to FIG. 1, or the animal accident reduction system 200, as described above, with respect to FIG. 2.

However, as shown in FIG. 5, certain of the elements or components included in the animal accident reduction system 500 are located in the housing 505, while other of the components are located in the power and control apparatus 570.

For example, in various exemplary embodiments, an input detector 520 (not shown) is located in the housing 505, while the remaining elements or components, such as, for example, a logic and control circuit 530 (not shown) and an output device 540 (not shown) are located within the power and control apparatus 570.

Alternatively, in various other exemplary embodiments, the input detector 520 (not shown) and the output device 540 (not shown) are located in the housing 505, while the remaining elements or components, such as, for example, the logic and control circuit 530 (not shown) is located within the power and control apparatus 570.

In still other exemplary embodiments, the output device 540 (not shown) is located in the power and control apparatus 570, while the remaining elements or components, such as, for example, the input detector 520 (not shown) and the logic and control circuit 530 (not shown) is located within the housing 505.

It should be appreciated that these outlined exemplary embodiments are merely exemplary and that any of the elements or components included in the animal accident reduction system 500 may be located in the housing 505, and that all remaining elements or components, if any, may be located in the power and control apparatus 570.

In each of the embodiments of the animal accident reduction system 500, the elements or components located in the housing 505 are connected, via the connection 580, to the remaining elements or components, as necessary, in the power and control apparatus 570.

In the various exemplary embodiments described herein, the connection 580 may be any known or later developed device or system for connecting the elements or components located in the housing 505 to the elements or components in the power and control apparatus 570, including a wireless link, an optical fiber, a direct wired connection, a connection over a cable, a very high frequency (VHF) connection, an ultra high frequency (UHF) connection, a radio frequency (RF) connection, a satellite connection, or the like. In general, the connection 580 can be any known or later developed connection system or structure usable to connect the elements or components located in the housing 505, either directly or indirectly, to the elements or components in the power and control apparatus 570, including both wired and wireless connections.

Optionally, an underground conduit 585 may be used to house and protect the connection 580.

The animal accident reduction system 500 may be powered by any power supply, including, but not limited to, the voltage that powers roadside billboards, battery or any combination of battery, solar cell, solar panel, capacitance, direct power connection, or any known or later developed system or structure usable to provide the necessary power to the animal accident reduction system 500.

While this invention has been described in conjunction with the exemplary embodiments outlined above, it is evident that many alternatives, modifications, and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An animal accident reduction apparatus, comprising:
   a housing functioning as a raised reflective pavement marker;
   at least one input detector located within the housing to detect presence or proximity of a vehicle;
   at least one logic and control circuit located within the housing, wherein the at least one logic and control circuit is connected to the at least one input detector such that the at least one logic and control circuit shall receive a signal from the at least one input detector; and
   at least one output device located within the housing, wherein the at least one output device is connected to the at least one logic and control circuit such that the at least one output device shall receive a signal from the at least one logic and control circuit, and wherein the output device is capable of producing a determined sound, noise, or mechanical output to warn animals.

2. The animal accident reduction apparatus of claim 1, wherein the housing is formed from a weather-resistant material.

3. The animal accident reduction apparatus of claim 1, wherein the housing includes at least one opening.

4. The animal accident reduction apparatus of claim 3, wherein the at least one opening is covered by a protective material designed to accommodate the output or input device in its proposed operating environment.

5. The animal accident reduction apparatus of claim 1, wherein the input detector is at least one photodiode.

6. The animal accident reduction apparatus of claim 1, wherein the input detector is at least one infrared sensor.

7. The animal accident reduction apparatus of claim 1, wherein the at least one input detector is at least one photodiode and at least one infrared sensor.

8. The animal accident reduction apparatus of claim 1, wherein the logic and control circuit includes at least some of a microcontroller and a Programmable Storage Device, wherein the microcontroller is capable of receiving at least one input signal from the input detector and sending at least one output signal to the Programmable Storage Device.

9. The animal accident reduction apparatus of claim 8, wherein the Programmable Storage Device is a voice and/or signal record/playback device.

10. The animal accident reduction apparatus of claim 1, wherein the logic and control circuit includes a real-time clock circuit.

11. The animal accident reduction apparatus of claim 1, wherein the at least one output device is at least one of an audio speaker, an audio transducer device, or a vibration device or a data system interface connector.

12. The animal accident reduction apparatus of claim 1, wherein the at least one output device is positioned so as to produce a directional output.

13. The animal accident reduction apparatus of claim 1, further including at least one power supply located within the housing.

14. The animal accident reduction apparatus of claim 1, wherein the at least one power supply is at least one of a battery, a solar cell, a solar panel, a capacitance, or other state-of-the-art energy storage system.

15. The animal accident reduction apparatus of claim 1, further including a connection to at least one power supply located outside of the housing.

16. An animal accident reduction system, comprising:
at least one power and control apparatus;
at least one housing functioning as a raised reflective pavement marker;
at least one input detector located within either the at least one housing or the at least one power and control apparatus to detect presence or proximity of a vehicle;
at least one logic and control circuit located within either the at least one housing or the at least one power and control apparatus, wherein the at least one logic and control circuit is connected to the at least one input detector such that the at least one logic and control circuit shall receive a signal from the at least one input detector; and
at least one output device located within either the at least one housing or the at least one power and control apparatus, wherein the at least one output device is connected to the at least one logic and control circuit such that the at least one output device shall receive a signal from the at least one logic and control circuit, and wherein the output device is capable of producing a determined sound, noise, vibration or signal to warn animals.

17. A method for using an animal accident reduction apparatus, comprising:
deploying nanotechnology or microtechnology scale input detectors for detecting presence or proximity of a vehicle and embedded inside of a retroreflective pavement marker housing;
transmitting, in response to the input detector(s) detecting an appropriate input, a signal from the input detector(s) to a logic and control circuit;
transmitting, in response to the logic and control circuit receiving a signal from the input detector(s), a signal from the logic and control circuit to an output device; and
outputting, in response to the output device receiving a signal from the logic and control circuit, a specific noise, sound, signal, or vibration, or a specific series of noises, sounds, or vibrations from the output device to warn animals.

18. The method of claim 17, wherein the specific noise, sound, signal, or vibration, or a specific series of noises, sounds, or vibrations from the output device shall have programmable frequency ranges; the programmable output frequency shall include, but is not limited to a frequency range of about 20.5 khz to about 22.5 khz.

19. The method of claim 17, wherein the specific noise, sound, signal, or vibration, or a specific series of noises, sounds, or vibrations from the output shall have programmable output ranges; the programmable output frequency shall include, but is not limited to a frequency of about 8 khz.

20. A method for using an animal accident reduction system, comprising:
embedding nanotechnology or microtechnology scale input detectors inside of a retroreflective pavement marker; detecting an appropriate light and/or motion input indicative of the presence or proximity of a vehicle;
transmitting, in response to the input detector(s) detecting an appropriate light and/or motion input, a signal from the input detector(s) to a logic and control circuit;
transmitting, in response to the logic and control circuit receiving a signal from the input detector(s), a signal from the logic and control circuit to an output device; and
outputting, in response to the output device receiving a signal from the logic and control circuit, a specific noise, sound, signal, or vibration, or a specific series of noises, sounds, or vibrations from the output device to warn animals.

* * * * *